No. 676,797. Patented June 18, 1901.
T. S. MILLER.
ROPE TRANSMISSION.
(Application filed Apr. 30, 1898.)
(No Model.) 2 Sheets—Sheet 1.

WITNESSES:
D. H. Hayford
M. Wilson

INVENTOR
Thomas Spencer Miller
BY Gifford & Bull
ATTORNEYS

UNITED STATES PATENT OFFICE.

THOMAS SPENCER MILLER, OF SOUTH ORANGE, NEW JERSEY.

ROPE TRANSMISSION.

SPECIFICATION forming part of Letters Patent No. 676,797, dated June 18, 1901.

Application filed April 30, 1898. Serial No. 679,321. (No model.)

*To all whom it may concern:*

Be it known that I, THOMAS SPENCER MILLER, a citizen of the United States of America, and a resident of South Orange, county of Essex, and State of New Jersey, have invented certain new and useful Improvements in Rope Transmission, of which the following is a specification.

I believe that my invention finds its greatest utility in connection with what I will call the "separate rope transmission," or, in other words, transmission which is accomplished by separate endless ropes applied one in each pair of grooves, the tension for driving being dependent upon the tightness with which the separate endless ropes are applied.

My invention is particularly applicable to rope transmission when the larger pulley is the driver.

Heretofore it has been found in practice that the ropes do not pull alike nor do they tend to give to the driven wheel an equal velocity. This I believe is due to the unequal diameters of the various ropes and the unequal degrees of hardness of the ropes and the unequal tensions with which they may be applied.

The object of my invention is to overcome this difficulty, and I propose to accomplish this by making the forms of the grooves in the pulleys employed such that the larger ropes will ride enough higher in the groove of the larger pulley than in the groove of the smaller pulley to maintain the same velocity ratio with all the ropes.

Figure 1:
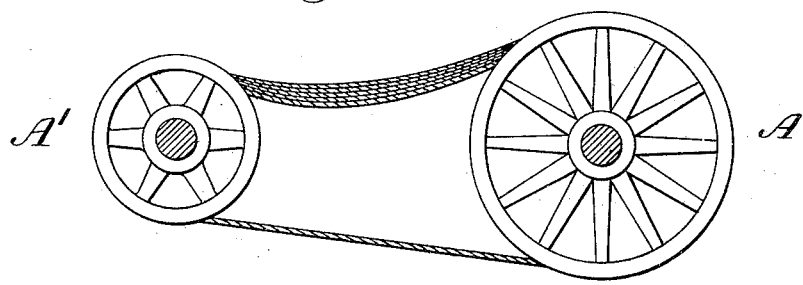
Figure 2:
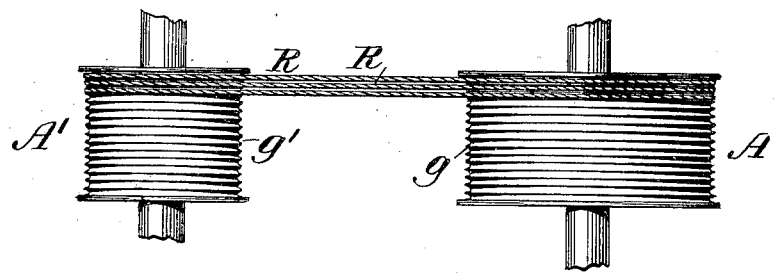
Figure 3:
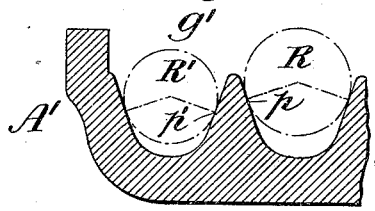
Figure 4:
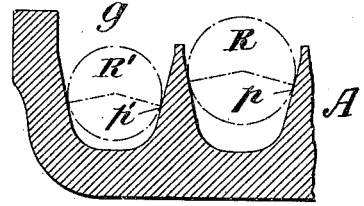
Figure 5:
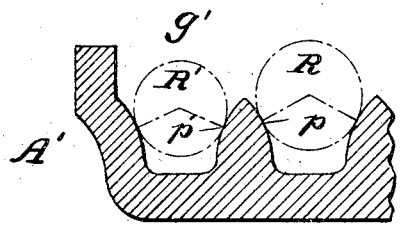
Figure 6:
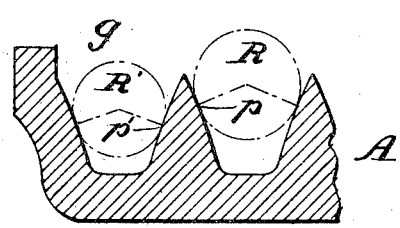
Figure 7:
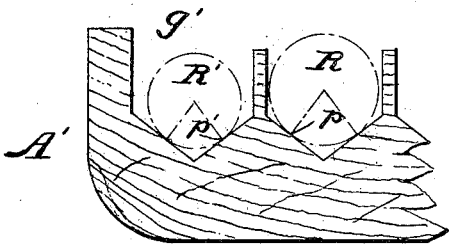
Figure 8:
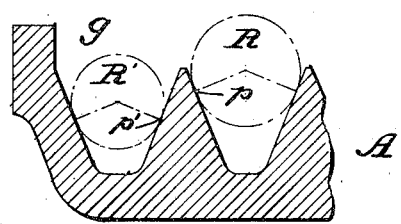

In the drawings, Figure 1 represents a side elevation of a driver and driven pulley connected by a series of independent endless ropes. Fig. 2 is a top or plan view of the same with only three ropes shown. Figs. 3, 5, and 7 are each an enlarged cross-section of the groove or rim of the small pulley. Figs. 4, 6, and 8 are each the same of the large pulley.

Similar letters of reference indicate similar parts in all the figures.

A represents the large pulley, and A' the small pulley.

R' represents the smaller ropes, and R the larger ropes. Each of the ropes is of the kind usually employed in grooves where the rope rests against the converging sides above the bottom of the groove and which, as is well known, are composed of vegetable fiber—such as cotton, manila, or hemp.

$g$ represents the grooves in the large pulley, and $g'$ the grooves in the small pulley.

$p$ represents the points of contact of a large rope in a groove, and $p'$ the points of contact of a small rope.

Let us suppose that in a drive of this sort using the smaller ropes A the driver makes one hundred revolutions per minute and is twice the diameter of the driven. Then the driven will run with the small ropes two hundred revolutions. If now a large rope R is applied to both wheels, then the effective diameter of the pulleys will be increased a certain amount, and as the velocity ratio with the small rope is two to one to maintain the same velocity ratio with the large rope the effective diameter must be increased twice as much on the large pulley as on the small pulley. In other words, the radial distance between $p$ and $p'$ in the large pulley must be twice the radial distance between $p$ and $p'$ in the small pulley. As a rule for regular practice the increase of effective diameter of the large pulley over that in the small pulley must be substantially that of the ratio in the diameter of the pulleys.

By examining the form of groove of small pulley in Figs. 3, 5, and 7 it will be seen that the ropes R and R' rest in angles more obtuse than they do in the grooves of the large pulley in Figs. 4, 6, and 8 and that the increase in effective diameter of large rope R over small rope R', Figs. 3, 5, and 7, is thereby much less than the increase in effective diameter of R over R' in Figs. 4, 6, and 8. I also propose to accomplish the same thing by using a form of groove of the smaller pulley with sides curving away from one another, as shown in Fig. 5, and the same in the larger pulley by using curved sides curving away from one another, only to a lesser degree than the curves of the small pulley. These curves bear such relation to one another that in all positions of the ropes they may give to the wheels the same velocity ratio. If the sides of the larger pulley curve toward one another, then the curves of the small pulley should curve toward one another. The form of groove shown in Figs. 5 and 6 I believe is new and has a great advantage, as will be readily understood. The wider the angle employed the greater will be the life of the rope, but at the expense of greater journal friction. If on a wide angle the ratio of slack side of rope to that on the tight side of the rope was as one is to two, then with three hundred pounds tension on the tight rope the tension on the slack rope to support it would have to be not less than one hundred and fifty pounds and the effective pull available for power transmission is the difference, or one hundred and fifty pounds. If now on a sharper angle the ratio of slack to tight rope were one to two and one-half, then a pull on the tight rope of two hundred and fifty pounds would be sustained by a slack tension of one hundred pounds and the effective pull would be the same as before—namely, one hundred and fifty pounds. The sum of the tensions in the first case is four hundred and fifty pounds, while in the latter only three hundred and fifty pounds. As the rope wears it becomes smaller and weaker, and yet it is expected to transmit the same power. If now the pulleys be grooved, as shown in Figs. 5 and 6, with the sides curving away from one another, it will be observed that as the rope wears and becomes smaller and weaker it rests in a sharper angle and the tension to transmit the same power is thereby reduced, and, furthermore, as the journal friction is less there is less work for the rope to do.

Another feature of improvement consists in the use on the smaller pulley of grooved surfaces having a higher coefficient of friction than the grooves of the larger pulley. It will be observed that in driving with ropes where the larger wheel is grooved, say, to forty-five degrees and the ratio of the diameters of the larger and smaller pulleys is, say, five to one, it will be necessary to widen the angle of groove on the smaller wheel to such an extent that the driving effect will be greatly diminished. Hence the loss of frictional hold due to the widening of the angle of the groove should be compensated for in some other way. This may be done by increasing the friction between the ropes and the surface of the grooves—as, for example, by making the smaller pulley of wood, Fig. 7, or some other material having a higher coefficent of friction than iron or by lining all the grooves with leather, rubber, wood, or some other equivalent substance. Experience has proved that wooden sheaves as ordinarily employed have worn so unequally as to be unfit for rope-driving as ordinarily installed; but as by means of this invention the inequalities of the strain and speed are offset by proportioning the angles of the grooves on the pulleys there will be little or no appreciable slip to damage either the rope or the pulley, and hence the use of wood or leather-lined sheave-wheels will be permissible.

I do not wish to limit myself to any particular conformation of the grooves.

What I claim is—

In a rope-driving system the combination of driving and driven wheels having rope-receiving grooves, the angles between the sides of the grooves being more obtuse in the smaller wheel than in the larger, in a ratio dependent upon the ratio of the diameters of the wheels, whereby the same speed ratio may be secured with ropes of different diameters.

THOMAS SPENCER MILLER.

Witnesses:
CHARLES G. MUNIER,
CHAS. C. PIERCE.